Patented Dec. 16, 1947

2,432,688

UNITED STATES PATENT OFFICE 2,432,688

COMPOSITION AND METHOD FOR FORMING SEPARATING FILMS ON DENTAL STONE

Fred A. Slack, Jr., Penn Valley, Pa., assignor to R. D. Justi & Son, Inc., Philadelphia, Pa., a corporation of Pennsylvania No Drawing. Application February 2, 1944, Serial No. 520,819

7 Claims. (Cl. 18—55.1)

1

This invention relates to compositions and methods for forming films for use as dental separators.

It has become well established in the art of dental prosthesis to utilize thin films to separate dental stone or investment material from the acrylic or other plastic denture material in the construction of prosthetics such as jackets, crowns, pontics, facings, dentures, and the like. Many materials have been used in the past for the purpose but the most successful and practically universally used material prior to this invention was the so-called "tin-foil." In using this material, a thin sheet thereof was applied in juxtaposed overlying relation to the impression in the mold, and it was then forced into intimate association therewith to follow the contours as exactly as possible, and finally the applied substantially adherent foil was burnished with burnishing instruments to insure the utmost in intimacy of bond with the stone contours. This material had to be carefully cut and shaped so as to overlie only the stone without also covering the pins, teeth or other articles or materials to be associated in the mold. Obviously, this represented a more or less protracted labor operation, and with the advent of war, the tin-foil technique became obsolete because of the unavailability of the tin-foil. Many attempts have been made to use other forms of films for the purposes of separation, but so far as known, they have been unable to successfully replace tin-foil, and have been of the nature of makeshifts, and have been generally unsatisfactory from almost all standpoints.

The search for substitutes for tin-foil for separation purposes has led to all sorts of experimental developments involving various materials including, for instance, sodium silicate (waterglass), starch, and other carbohydrates, varnishes, algin and the like. All have had certain undesirable features arising out of their own natures and characteristics while also being possessed of one failing or disadvantage which, so far as known, was common to all of the foil substitutes. This disadvantage arises from the fact that the separating film becomes attached and more or less adherent to every surface which it touches whether it is a surface requiring separation, or a surface which must not be separated. Thus, all exposed or contacted surfaces, including teeth, gold or other metal bars, repair surfaces requiring no separation, as well as dental stone, investment material, or plaster, which actually is the only sort of material requiring separation, would have the common film coex-

2 tensive over all surfaces. The film either had to be cut or scraped from the surfaces, which would be adversely affected by its presence, or such care had to be exercised to prevent it from touching these surfaces as either to increase the time and skill necessary to complete exactly proper separation to a point and degree approaching economic inefficiency, or it was for all practical purposes impossible, and some parts of all films had to be removed.

Of all substitutes for tin-foil, those formed by algin seemed best, both from the standpoint of ultimate film integrity, as well as that of strength to receive and to "stand up" under molding pressures without disintegration or undue yielding. However, as previously used in a solution, usually containing a preservative, it formed a film upon every surface with which it came into contact and upon which it was permitted to stand and dry or evaporate. Moreover, as used hitherto, even this first application of algin solution and the formation of a film had to be followed by the application of a second liquid to the film left by the first solution in order to condition and harden the algin film resulting from the initial solution. Obviously, the formation of a separating film of algin on those portions that are not to be separated, as well as upon those that do require separation, and the necessity for making two different applications, militates against the success of the algin preparations of the past, as they have been possessed of difficulties not found with conventional tin-foil, for instance.

I have discovered that algin derivatives, and especially algin salts, can be successfully used with an obviation of all of the disadvantages of the prior art of separators, and with the addition of new and hitherto unobtainable advantages by the invention herein. As used hereinafter, it is to be understood that "algin" is intended to include algin as well as algin derivatives and algin salts, such as the alginates.

It is among the objects of this invention: to improve the art of separators; to provide a separator such that the separating film is selective and is automatically restricted in its attachment to those portions of the assembly in which separation is required; to provide a separating mixture such that a separating film is formed only over the stone or stone-like portions of the assembly, that is, which only forms in contact with plaster, dental stone or investment material; to provide a separating film-forming mixture which remains in suspension in a liquid and which only enters into solution in the liquid in the presence of the plaster material which requires separation; to provide a liquid mixture containing algin with a solution-inhibitor with means in the mixture for releasing from selected materials matter which nullifies the inhibitor and permits the algin or alginate to enter into a solution which forms a film only over the material from which the matter noted was released; to improve the art of dentistry; to reduce the time formerly necessary to complete the formation of dentures and the like; to provide a tough integral separating film of extreme thinness; to provide a dental separating film of uniform thickness thinner than conventional tin-foil for the purpose; and many other objects and advantages will become more apparent as the description proceeds.

In carrying out the invention in a preferred form, I provide a mixture of water and algin with a solution-inhibitor such as potassium phosphate to prevent the algin from dissolving in the water, and thus maintaining the algin in a suspension only. The suspension is of fine particles, however. To this mixture in suspension there is preferably, although not essentially, added a small amount of wetting agent such as any form of sulphonated alcohol, for instance, and the mixture is completed by the addition of a very small amount of a chemical that is capable of attacking the surface of dental stone or plaster such as sodium citrate. The algin, the solution-inhibitor, the wetting agent and the calcium ion liberating chemical may be provided as a dry powder after rumbling in a ball mill for ultimate mixing with the water, or they may all be mixed in water and maintained as a liquid mixture. The sodium citrate attacks the calcium in the dental stone, investment or plaster, and releases a sufficient number of calcium ions therefrom to overcome the inhibitory functions of the potassium phosphate, permitting the algin in suspension in the liquid to enter into solution therewith, which automatically hardens and solidifies into a film after application and evaporation of the water vehicle, but only over the surface from which the calcium ions have been released. As the pins, teeth and the like contain no calcium capable of giving off calcium ions because of action of the sodium citrate, it will be clear that so far as such non-separating parts are concerned, even though contacted by the liquid mixture, there will be no film formed as the liquid thereover is not in a solution but only contains the algin as a suspension, which will simply dry out leaving a mere dust which is readily blown off or otherwise removed, and even if not removed, not in sufficient evidence to be seen or cause separation.

It is to be understood that the proportions to be given hereinafter are purely illustrative and that the actual amounts or volumes which will secure the desired result may be varied within wide limits. However, in order to give at least one exact formula that will enable one skilled in the art to practice the invention in a highly satisfactory manner, the following will be considered typical but purely illustrative, for twenty-seven gallons of water. To the twenty-seven gallons of water is added twenty-four ounces of algin (avoirdupois) preferably, in a specific illustration, water-soluble high-viscosity alginate, although low-viscosity alginate can be used, depending upon demands from the standpoint of more or less prolonged shelf life. The high-viscosity alginate has a longer shelf life than that of the lower viscosity. To the alginate mixture is added six ounces (avoirdupois) of potassium phosphate, and only two dwt. of sodium citrate, which obviously forms a microscopically small proportion in the final mixture, and finally there is also added, preferably, three liquid ounces of sulphonated alcohol or like wetting agent.

For the same amount of water for ultimate admixture, all of the other ingredients in the proportions recited can be assembled in a ball mill dry powdered condition for shipping and storage, and for ultimate mixing with the water.

Doubtless there may be other materials that will cooperate with the mixture to hold the alginate in suspension only, other than the potassium phosphate noted, and such other materials are deemed to be within the scope of the invention, just as there may be other wetting agents, and possibly other materials which have the property of liberating a portion of or something from, a surface to overcome the solution-inhibiting potassium phosphate or its equivalent, and all such are to be considered as within the scope of this invention. It is especially noteworthy that the proportion of the sodium citrate to all other ingredients is so small. The wetting agent may be eliminated without reducing the chemical action, but giving less mechanical effectiveness.

With the invention herein, the dentist or technician either has the liquid mixture already mixed, or mixes it in suitable proportions as needed from dry stock. With a given prosthetic assembly including dental stone or the like, either with or without elements which must not be separated, such as teeth, bars or the like, the operator applies a coating of the stirred mixture to the entire assembly surface. Wherever the mixture impinges upon calcium-containing material, such as the dental stone, investment material or plaster, and only there, the sodium citrate reacts with the calcium-containing material and liberates calcium ions. The latter enter into the liquid mixture and overcome the action of the potassium phosphate and nullify the previously exercised solution-inhibiting functions of the latter, permitting the alginate to dissolve in the liquid, which solution when dry forms a separating film of extreme thinness, but of suitable hardness and strength, but which exists only over the calcium-containing portions of the assembly. Elsewhere the mixture remains a suspension which when dry leaves a microscopic residue of powder only.

In reciting the products of algin that are available, it is to be understood that it is preferred to use high-viscosity algin or either potassium, sodium or ammonium alginate or mixtures thereof, as specific algin salts from which the improved separating film of this invention can be created according to this invention, although other algin salts may likewise be used as experiment indicates.

Having thus described my invention, I claim:

1. A mixture for forming dental separators for admixture with water comprised of approximately twenty-four ounces avoirdupois of water soluble algin, approximately six ounces avoirdupois of potassium phosphate and approximately two dwt. of sodium citrate for and which mixture does not contain calcium.

2. A mixture for selectively forming dental separators, comprising water soluble algin, potassium phosphate, and sodium citrate free from calcium and arranged for admixture with water, with which water the algin is held in an aqueous suspension which remains a suspension until the mixture contacts calcium.

3. A mixture for selectively forming dental separating films, comprising water soluble algin, potassium phosphate, sodium citrate, and a wetting agent free from calcium and arranged for admixture with water, with which water the algin is held in suspension until a contact is made with calcium.

4. A mixture for selectively forming dental separating films on the surfaces of materials, one of which contains calcium, which comprises water soluble algin, potassium phosphate, sodium citrate and water, and which mixture is of itself free from calcium with the algin in a suspension which is permanent unless and until applied to a surface containing calcium when it becomes a solution in juxtaposition to the calcium-containing surface only.

5. A mixture for forming dental separators comprised of approximately twenty-four ounces avoirdupois of water soluble algin, approximately six ounces avoirdupois of potassium phosphate, approximately two dwt. of sodium citrate, and approximately three liquid ounces of a wetting agent, for admixture with water and which mixture does not contain calcium.

6. The method of automatically selectively forming a dental separating film on the surface of dental stone or the like containing calcium which stops at the edge of the dental stone without running over onto any associated surfaces free from calcium, which comprises providing an assembly of dental stone or the like containing calcium and an associated contiguous material free from calcium in a continuous surface disposition, indiscriminately coating the continuous surface to substantially cover the surfaces of both the dental stone or the like and the associated material with a mixture of water soluble algin, sodium citrate and potassium phosphate in an aqueous suspension, the potassium phosphate preventing solution of the algin by reaction of the sodium citrate with the calcium in the dental stone or the like causing the solution-inhibiting effect of the potassium phosphate to be overcome in sufficient degree to cause the entry of the water soluble algin into solution in the mixture in contact with the dental stone or the like only, and drying the solution to form a dental stone surface-covering film.

7. The method of automatically selectively forming a dental separating film over the calcium-containing surface portions only of a total surface formed by contiguous independent materials of which one material contains calcium, which comprises adding water soluble algin, potassium phosphate and sodium citrate to water to form an aqueous suspension, the potassium phosphate preventing solution of the algin coating substantially said total surface with the aqueous suspension, forming a solution of the algin that portion only of the coating which is superposed upon the material containing calcium, the action of the sodium citrate and calcium overcoming the solution-inhibiting effect of the potassium phosphate in these regions, and drying the coating in solution to form a film and the coating in suspension to form a powder.

FRED A. SLACK, JR.

REFERENCES CITED

The following references are of record in the file of this patent:

UNITED STATES PATENTS

| Number | Name | Date |
| --- | --- | --- |
| 341,072 | Stanford | May 4, 1886 |
| 349,760 | Stanford | Sept. 28, 1886 |
| 2,249,694 | Wilding | July 15, 1941 |
| 2,333,679 | Schoonover et al. | Nov. 9, 1943 |
| 2,345,255 | Gross | Mar. 28, 1944 |

Certificate of Correction

Patent No. 2,432,688.                                                December 16, 1947.

FRED A. SLACK, Jr.

It is hereby certified that the name of the assignee in the above numbered patent was erroneously described and specified as "R. D. Justi & Son, Inc." whereas said name should have been described and specified as *H. D. Justi & Son, Inc.*; column 6, line 17, claim 7, after the word "algin" insert a comma; and that the said Letters Patent should be read with these corrections therein that the same may conform to the record of the case in the Patent Office.

Signed and sealed this 16th day of March, A. D. 1948.

[SEAL]

THOMAS F. MURPHY,
*Assistant Commissioner of Patents.*